GREASE MANUFACTURING PROCESS FOR PIGMENT OR DYE GELLED OILS

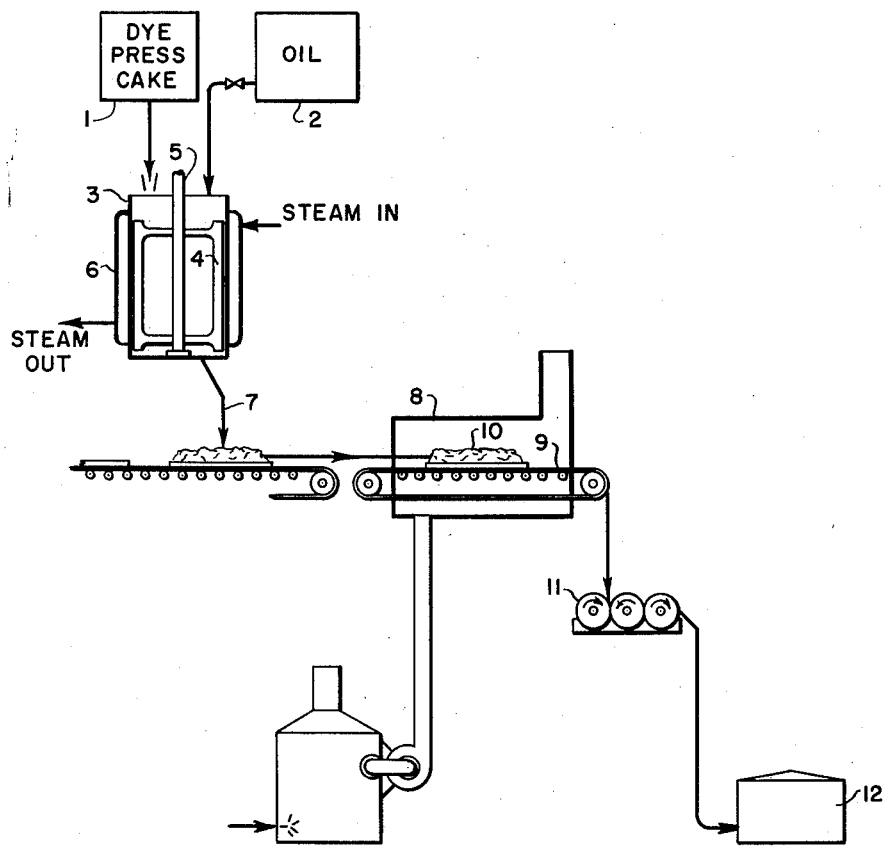
INVENTORS:
JACK W. ARMSTRONG
HAROLD A. WOODS

Jack W. Armstrong, Concord, and Harold A. Woods, Martinez, Calif., assignors to Shell Development Company, New York, N.Y., a corporation of Delaware Application December 16, 1957, Serial No. 702,864

4 Claims. (Cl. 252—49.6)

This invention relates to an improved process for the preparation of grease compositions. More particularly, it is related to an improved process for the preparation of greases gelled with certain high temperature resistant pigments and dyes.

As lubricants are required to perform at higher and higher temperatures because of increased speeds of engines and machines, the advent of jet propulsion and atomic energy as sources of power, etc., it has become increasingly difficult to provide greases fulfilling the requirements of such lubricants. In attempting to provide suitable greases, the art has progressed from the use of petroleum lubricant vehicles thickened with metal soaps of long chain fatty acids to more thermally stable synthetic lubricating oils such as the aliphatic diesters, silicone polymers, etc. thickened with such soaps or inorganic materials such as silica gels or clays. The progress of thickener research has not in general kept pace with the development of lubricant vehicles. At operating temperatures as high as 400–450° F. there are few greases available which will retain their consistency and lubricity for any substantial period of time.

One of the prominent advances in the art of high temperature grease lubrication has comprised the provision of greases gelled with dyes or pigments of three principal classes, namely, indogen compounds, phthalocyanine compounds, and especially indanthrene compounds. The art of preparing greases from these particular classes of materials has not been developed. Consequently, the greases comprising such dyes normally require excessive amounts of the gelling agent to produce the grease structure. This has been due to the utilization of methods by which soap base greases or inorganic gel base greases have been prepared in the past. Essential steps in such preparations have comprised the milling of the grease-forming ingredients such as in a colloid mill, 3-roll mill or the like, as well as stirring and heating the compositions to produce a grease structure. However, such operations have been found insufficient to produce greases from these dyes or pigment particles without utilizing excessive amounts thereof. Since the dyes are expensive materials costing 20–100 times as much as soap it will be evident that greases made by these undesirable earlier processes result in the formation of compositions having a high cost. Consequently, any method by which the proportion of dye required to produce a given consistency of grease can be reduced would be desirable and economically beneficial.

It is an object of the present invention to produce grease compositions. It is another object of the present invention to provide a process for producing greases from dyes and pigments. It is a particular object of this invention to provide a process for the production of greases having a higher yield value. It is a further object of this invention to provide a process of grease manufacture involving less complicated apparatus than heretofore required. Other objects will be apparent in the description of the invention.

The drawing is a cross-sectional view of a turbulent film drying apparatus useful in the process of this invention.

Now, in accordance with the present invention an improved method for the preparation of greases comprises admixing a hydrophobic lubricating oil with an aqueous suspension of water-insoluble dyes of the group consisting of indogen compounds, phthalocyanine compounds, and indanthrene compounds, passing the mixture so formed over a heated surface at a temperature between about 300 and 350° F. (preferably 320–340° F.), the film of the mixture on said surface being maintained between about 0.001 and 0.02 inch in thickness by means of blades which are travelling at a rate of 1,000–10,000 feet per minute at the point of contact with the mixture, maintaining the mixture in contact with the heated surface for a period between about 1 and about 30 seconds, removing the film to a static heat treating zone wherein the dye and oil composition is heated for a period between ¼ and about 4 hours at 250–550° F. and thereafter subjecting the substantially anhydrous mixture to shearing action whereby a grease structure is formed which exhibits a substantially greater "yield" than dye greases produced by former methods. Preferably, the heated surface is in the form of the interior surface of a cylinder in which is concentrically positioned a set of rotating blades which turn at a rate of speed as indicated above and are set at a clearance from the surface to provide the necessary film thickness as specified.

The drawing illustrates the preferred apparatus for carrying out the rapid drying step of the process of this invention. In the figure, a dye press cake comprising water and dye particles is introduced from the source 1 together with lubricating oil from a source 2 into the hollow cylinder 3 preferably against the interior wall thereof which is being swept by the concentrically positioned set of blades 4 which rotate about a central shaft 5. These blades are set to clear the interior surface of the cylinder so that a film of the ingredients is maintained at a thickness between about 0.001 and 0.02 inch in thickness. The composition as it passes through the cylinder is heated such as by means of indirect heat exchange with a steam heated jacket 6. The blades are rotated so as to contact the film of dye and oil at a speed of 1,000–10,000 feet per minute. The treated mixture of dye and oil emerges at outlet 7 and passes to a heat treating space 8 which is preferably forced draft oven. In this space the mixture of dye and oil is heated in the quiescent state although the mass thereof 10 may be passing through the oven by means of a travelling belt 9 or other arrangement. The mixture emerges from the oven after the required heat treating period of ¼–4 hours at 250–550° F. and passes to a colloiding system such as a 3-roll paint mill or colloid mill 11. At the time it reaches the colloiding apparatus, the mixture is substantially anhydrous, that is, contains less than about 0.25% by weight of water. The degree of milling necessary to obtain the desired grease structure will depend upon several factors such as the identity of the pigment, its state of subdivision, the identity of the lubricating oil, the temperature at which colloiding is performed, the other conditions occurring during the colloiding, and other variables with which experts in the art of grease manufacture are familiar. When the desired grease structure has been obtained in the colloid apparatus, the grease so prepared is then passed to a storage receptacle 12.

The heated surface over which the film of grease is advanced may be in the shape of a cylinder as described above or may be other shapes such as a truncated cone interior or exterior surface or even a flat surface (preferably inclined), the rotating or moving blades being positioned so as to maintain the film within the critical film thickness defined hereinbefore. It is preferred that the surface be open to the atmosphere or at least that provision be made for the escape of steam and water vapor since, during the passage of the mixture over the surface, a substantial amount of the water introduced in the aqueous dye suspension evaporates at this time.

The apparatus may be called a thin film turbulent flow dehydrator. The purpose of the dehydrator is not only to remove most of the water present in a minimum length of time but also to treat the grease in such a way that subsequent homogenizing operations are minimized. The action of the blades upon the thin film constitutes the treatment desired during the short heating period to which the grease is subjected under these conditions. While these features would in themselves be desirable, it is also desired in this particular step, combined with those which succeed it, to improve the properties of the grease relative to the high temperature stability and yield thereof as will be evidenced by the data given in the examples appearing in this specification.

It has been found, in accordance with one feature of this invention, that the speed at which the blades move when in contact with the grease film materially effects the properties of the grease especially as measured by the consistency thereof. When the skin temperature of the dehydrator is between about 300 to 350° F. and when the residence time is between about 1 and 20 seconds, the blades should be operated at a speed between about 1,000 and about 10,000 feet per minute at the point of contact with the grease film in order to obtain the maximum consistency of the grease following the subsequent steps of the tretament as described. When the rotating or moving blade is operated at lower speeds, water is not removed to its maximum extent during the short residence period and the yield of the grease is not satisfactory. This appears to be due to the fact that when lower speeds of blade operation are utilized the grease film proceeding through the dehydrator is made up of two layers, namely, a disturbed layer nearest the scraper edge and a relatively static layer based immediately upon the heat exchange surface. Due to the static nature of this adjacent latter layer, the heat exchange is only about 10 and 20% of that obtained when higher speeds are employed. Consequently, the composition requires relatively longer times of dehydration in order to remove a given amount of water and to obtain the optimum yield value in the grease as eventually used.

The term "substantially anhydrous" as utilized throughout this specification refers to a grease composition containing no more than about 0.25% (preferably less than 0.1%) by weight of free water.

Following passage of the film through the thin film dehydrator, the mixture of dye and oil is passed to a heat treatment section wherein the mixture is heated in an essentially quiescent state for a period of ¼–4 hours at a temperature between about 250 and 550° F. This heat treatment not only removes any remaining traces of water (if any) which were not expelled in the dehydrator but also causes a further beneficial modification of the structure of the dye particles resulting in their increased power to gel the oil to a grease consistency. Electron micrographs show that the product at the point of exit from the thin film dehydrator contains the dye in the form of agglomerates. During the static heat treating step these agglomerates separate to form what appear to be flat fibers. The mass of mixed pigment and oil may pass through the heat treatment compartment by any desirable means as long as it is essentially quiescent during the heat treatment period. Thus, it may be placed in the compartment in pans or may travel on a continuous belt through the compartment but it is preferred practice to leave the mass undisturbed during the heat treating period so as to obtain an optimum colloidal structure.

Subsequent to the heat treatment, the resulting mixture of dye and oil is sent to a colloiding apparatus, preferably a 3-roll mill or Gaulin homogenizer, wherein it is milled to obtain the desired grease structure.

If the thin film dehydrator, including the turbulent flow therethrough, is omitted, the grease is relatively soft for a given dye content. If, however, the grease is prepared utilizing all of the steps described herewith then it has been found that greases of substantially increased consistency for a given dye content are obtained. In fact, it has been noted that the same beneficial increase in consistency cannot be obtained by the use of older processes such as merely the use of the colloid mill (or 3-roll paint mill) either with or without the treatment in the static heat treating compartment. Although repetition of these steps increases the consistency of the grease, this is only possible to a limited extent. The utilization of a turbulent flow thin film dehydrator in conjunction with the static heater and colloid mill has been found to cause an unexpectedly great increase in the ability of the dye to stiffen the grease composition.

The most effective dye for use in high temperature greases has been found to be the parent compound of the series, namely, indanthrene itself, but other indanthrene compounds may be employed. It is best to utilize the indanthrene compounds in their non-metallic form, that is, without neutralization of the carbonyl groups in said compounds with such ions as sodium or potassium, calcium, etc. While it is possible to employ the partially or fully neutralized indanthrene compounds as grease thickening agents, greases having maximum lubricating life at elevated temperatures are those in which the carbonyl groups are free of any metallic substituents. Typical indanthrene compounds suitable for the present purpose include the following:

Indanthrene     Violanthrone
Flavanthrone    3,3'-dichloroindanthrene
Pyranthrone     3-chloroindanthrene The indanthrene dyes, which are used as the gelling agents in the subject greases, contain two units of the following essential typical grouping per molecule:

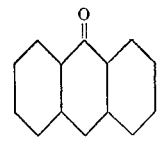

The tricyclic radical, it will be noted, has at least one carbonyl radical on the middle ring of the group. Some specific members of the indanthrene series, such as indanthrone, have two such carbonyl radicals attached to the middle ring. Others, such as flavanthrene, contain the single essential carbonyl radical, the tricyclic group being linked to a second such group by means of nitrogen linkages, or (as in the case of pyranthrone) through unsaturated hydrocarbon linkages. Thus, the two tricyclic nuclei may be linked by two —N= groups (as in flavanthrene); by two —NH— groups (as in indanthrene blue); by two =CH— groups (as in pyranthrone); or by intervening condensed ring systems (as in violanthrone). Another characteristic of the indanthrene dyes is that nitrogen is not a nuclear element present in the rings making up the essential tricyclic nuclei.

Another class of dye materials which may be utilized in high temperature greases prepared by the process of this invention include indogen compounds having the general structure:

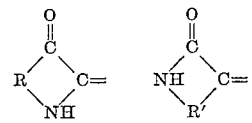

In the above formulae, R and R' represent aryl or alkylaryl radicals which are linked to the adjoining members of the heterocyclic rings by bonds disposed in ortho relation. These radicals may be the same or different and may be mono or poly cyclic, e.g., phenylene, biphenylene, naphthylene, etc. These aryl or alkylaryl radicals may be substituted radicals, containing various substituents such as hydroxy, carboxy, halo, nitro, etc. Examples of such compounds are indigo, iso-indigo, 3-keto-indoline, isatide, isatin, etc. It should be understood that these specific examples are enumerated for purposes of illustration and not of limitation.

A third class of dye or pigment materials which may be employed in the production of high temperature greases by the process of this invention comprise phthalocyanines which include not only metal free phthalocyanine but metal phthalocyanines such as zinc, nickel, aluminum, and particularly copper phthalocyanine. Chlorinated phthalocyanine and chlorinated metal phthalocyanine may also be employed. Of course mixtures of dyes from one or more of these three main groups may be utilized in grease formation.

These dyes are utilized in the process of the present invention in the form of aqueous suspension containing between about 15% and about 50% by weight of dye based on the total suspension, the remaining liquid phase being water or substantially composed of water modified with relatively volatile material such as alcohol, esters, or ketones. Preferably aqueous suspensions of the dyes are utilized wherein the entire liquid phase comprises water. The suspension may, in fact, be in the form of the dye press cake resulting from the dye manufacture. Most press cakes contain from about 20 to about 40% by weight of dye, the balance of the press cake being water. Any water-immiscible lubricating oil may be employed, such as mineral oils, silicones, chlorinated silicones, siloxanes, aliphatic dicarboxylic esters, polyoxyalkylene compounds, polyphenyl ethers, phosphates, silicates, phosphonates, phosphinates, etc., fluorocarbons, chlorofluorocarbons, etc. These include such species as dimethyl silicones and methylphenyl silicones, bis(2-ethylhexy)sebacate, diphenyl, diphenyl ether, trioctyl phosphate, tetrabutyl silicate, etc.

The following examples illustrate the process of this invention:

*Example I*

Greases were prepared using indanthrene press cake, two methods being compared. In the first method, namely, that known in the prior art, the press cake comprising 73% by weight of water and 27% by weight of indanthrene blue was mixed in a grease kettle together with a methylphenyl silicone polymer oil having methyl:phenyl ratio of about 0.6 and a viscosity in the range of from about 300 to about 400 SSU at 100° F. The proportion of dye to oil was varied to obtain grease compositions having consistencies matching NLGI grades from 0 to 3. The ingredients were paddle-mixed and dehydrated in the grease kettle and then subjected to homogenizing on a 3-roll paint mill. The product was then heated at a temperature from about 450° F. for one hour in a forced draft oven. The heating and homogenizing steps were repeated twice.

For the purpose of comparison the same ingredients were treated according to the process of this invention by passing the dye press cake and oil into a thin film dryer being operated under high pressure steam and having a skin temperature of about 330° F. The ingredients were maintained in a film 0.002 inch in thickness by rotating blades having a speed of about 5,000 feet per minute at the point of contact with the grease film. The residence time in the film dryer was about 20 seconds. The grease ingredients were then passed to a force draft air oven and held in a quiescent state at about 450° F. for one hour after which the heat treated material was homogenized on a 3-roll paint mill to obtain the finished grease. The table which follows shows that the method of this invention was more efficient than the prior art process not only in involving substantially fewer process steps but also in producing a grease requiring substantially less dye to obtain a given consistency grade:

| NLGI Grease Grade | Wt. Percent of Dye | |
|---|---|---|
| | Prior Art Process | Process of this Invention |
| 0 | 16-19 | 6-10 |
| 1 | 20-23 | 11-15 |
| 2 | 24-28 | 16-20 |
| 3 | 28-32 | 21-25 |

Another unexpected advantage of the use of this invention is the improvement in bearing life exhibited by greases prepared according to the improved process as compared with greases prepared by the prior art process. This is indicated by the bearing performance in the ABEC–NLGI bearing tester (CRC L–35 procedure) operated at 600° F. to failure. The NLGI grease grade No. 3 prepared by the prior art process permitted operation of the bearing for 64 hours before failure. However, when the grease made according to the process of this invention and having the same consistency was employed in this test, the bearing operated for 132 hours before failure.

*Example II*

A grease can be prepared by introducing 7 pounds of bright stock mineral oil and 15 pounds of a 20% indigo-water paste into the thin film dryer as illustrated in the figure. The ingredients are maintained in the thin film dryer for about 10 seconds as a film 0.0015 inch in thickness, the blades sweeping the surface of the film having a speed of about 7500 feet per minute. At the end of the residence period, the grease ingredients are transferred to a heat treatment area wherein they are statically heated for ½ hour at 400° F. and thereafter homogenized in a Cornell homogenizer to obtain a grease having an NLGI consistency of a number 2 grade.

We claim as our invention:

1. The process for the preparation of a grease composition which comprises: (a) commingling an aqueous grease-forming dye suspension with a major proportion, based on the dye, of a hydrophobic lubricating oil; (b) passing the mixture so formed over a surface having a skin temperature between about 300 and about 350° F. in the form of a film between 0.001 and about 0.02 inch in thickness, said film being sheared on said surface by means of blades travelling at a rate of 1,000–10,000 feet per minute, the residence time of the mixture on the surface being between about 1 second and about 30 seconds during which time substantially all of the water originally present in the suspension is evaporated; (c) heating the mixture for 0.25–4 hours at 250–550° F.; and (d) thereafter subjecting the substantially anhydrous mixture to shearing action, whereby a grease structure is formed.

2. The process for the preparation of a grease composition which comprises commingling an aqueous paste of an indanthrene dye containing 10–35% by weight of dye with a hydrophobic lubricating oil in a weight proportion of 5–20 parts oil for each part of dye, passing the mixture so formed over a surface having a skin temperature between about 320 and about 340° F. while being sheared as a film 0.0015–0.015 inch in thickness by rotating blades travelling at a rate of 2,500–7,500 feet per minute, the residence time on the surface being 2–20 seconds during which time substantially all of the water originally present in the suspension is evaporated, heating the mixture in a forced draft for ¼–4 hours at 350–500° F. and thereafter subjecting the substantially anhydrous mixture to shearing action, whereby a grease structure is formed.

3. Process according to claim 2 wherein the oil is a silicone lubricant.

4. Process according to claim 2 wherein the heated surface is the interior wall of a cylinder in which concentrically positioned blades are positioned, said blades rotating in a direction perpendicular to the path of travel of the oil and dye mixture.

References Cited in the file of this patent

UNITED STATES PATENTS 2,679,480    Brannen et al. ---------- May 25, 1954
2,848,417    Armstrong et al. -------- Aug. 19, 1958
2,851,418    Lyons et al. ------------ Sept. 9, 1958

OTHER REFERENCES

The Manufacture and Application of Lubricating Greases, Boner, Reinhold Pub. Corp., N.Y., 1954, pp. 690–697.